3,444,004
ELECTROCHEMICAL CELL HAVING AT LEAST ONE NON-CONSUMABLE ELECTRODE COMPRISING A POROUS METAL SUPPORT HAVING INTERNAL VOIDS SEALED WITH A HYDROPHOBIC POLYMER
Stanley W. Smith, Talcottville, Conn., assignor, by mesne assignments, to Leesona Corporation, Cranston, R.I., a corporation of Massachusetts
No Drawing. Filed Sept. 30, 1965, Ser. No. 491,884
Int. Cl. H01m 27/10
U.S. Cl. 136—120                    22 Claims

ABSTRACT OF THE DISCLOSURE

Lightweight electrodes for use in an electrochemical device are described. The electrodes comprise a porous metal support in which the internal voids of the support are filled with a hydrophobic polymer and an intimate admixture of catalytic metal and hydrophobic polymer with the catalytic metal being in conductive contact with a surface of the filled metal support.

---

This invention relates to a novel process for the construction of electrodes for use in an electrochemical device such as a fuel cell and to the electrodes made by the novel process. More particularly, the invention embraces a process for the construction of low thickness, lightweight electrodes having low internal electrical resistance. Essentially, the process comprises constructing electrodes by sealing or covering the cavities in a metal support with a thin film of a hydrophobic polymer and thereafter applying uniformly to the metal support a catalyst comprising a metal black and a hydrophobic polymer. For convenience hereinafter, the process for preparing electrodes will be described with emphasis being placed on their use in a fuel cell. However, as will be apparent, the electrodes of the process can be employed in other electrochemical devices where similar considerations apply.

In the prior art, the advantages of lightweight electrodes for use in fuel cells has been recognized. These electrodes which comprise a porous metal support coated with a catalytic material, such as a dispersion of metal black and hydrophobic polymer, being extremely thin, have low internal electrical resistance; and, furthermore, take up only a very small amount of space, permitting the construction of highly compact cells having a high energy to volume and energy to weight ratio. However, it has been found that these electrodes are difficult to construct, particularly in large sizes. Thus, it is extremely difficult to obtain a uniform dispersion of the catalyst and polymer into and onto the metal support and to obtain consistent reproducibility. Furthermore, the electrodes are not durable under the operating conditions of fuel cells, at least not over extended periods.

Accordingly, it is an object of the present invention to provide an improved process for the construction of thin, lightweight electrodes having high structural strength wherein the catalyst is uniformly applied.

It is another object of this invention to provide thin, lightweight electrodes which have high structural strength and which are reproducible.

These and other objects of the invention will become more readily apparent from the following detailed description, with particular emphasis being placed on the working examples.

Briefly stated, the objects of the present invention are accomplished by covering, or applying a continuous coating over the internal cavities or voids of a lightweight metal support, such as a metal screen, expanded metal, mesh or felt, with a hydrophobic polymer. The coating can be carried out by numerous methods including dipping of the metal support into a solution of a suitable polymer and drying, or by brushing or spraying the solution of polymer onto the support to obtain a continuous or substantially continuous coating of the polymer over the voids in the support. The polymer layer, while being sufficiently thick to be continuous, or substantially continuous, must not be so thick as to destroy the electrical contact between the catalyst of the elerode and the metal support. After sealing the metal support, a catalytic dispersion of metal black and hydrophobic polymer is uniformly applied to one or both major surfaces of the support. The total structure is then sintered at elevated temperatures; or alternatively, it may be desirable to dry and then lightly press the structure prior to the sintering operation. The resultant electrode is extremely thin, light in weight, and possesses a high degree of mechanical integrity even after extended periods of operation in a fuel cell. More critically, however, the electrodes made according to the present invention are highly reproducible.

As is apparent from the above description, the essential features of the novel process comprise the filling of the internal voids of the metal support with a continuous, or substantially continuous film of polymer, and the sintering steps. While it is not intended to be limited by the theory of the mechanism, it is believed that the filling of the internal cavities of the metal support contributes to the integrity of the structure, improves its wetting properties, and, additionally, provides a base for the catalytic material, i.e., the activating metal and polymer, assisting in the obtaining of a uniform coating by preventing blow through. Furthermore, it appears that the bonding of the catalytic layer to the support is enhanced as a result of the filling of the internal cavities. Apparently there is at least some coalescence between the polymer film filling the voids of the metal support and the polymer and metal black contained in the catalytic dispersion. It is apparent, however, that the integrity of the structure is excellent and further, permits good reproducibility.

According to the present invention, the metal support can be a metal screen, expanded metal, metal felt, or mesh. It is essential that the support be electrically conductive and able to withstand the corrosive environment of a fuel cell. Suitable metal screen supports, which are preferably from 0.4 to 0.1 millimeter thick with the mesh size being from 50 to 100 are composed of nickel, copper, iron, tantalum, titanium, zinc, gold, silver, platinum, palladium, osmium, and the alloys thereof. Primarily from a standpoint of their excellent resistance to heat and the corrosive environment of the cell, and their relative inexpensiveness, nickel, titanium and tantalum supports are preferred.

The catalytic metal which is applied to the metal support as a dispersion with the hydrophobic polymer can be composed of virtually any material which will favorably influence an electrochemical reaction such as copper, gold, nickel, silver, cobalt, and the like. However, because of their exceptional characteristic of catalyzing an electrochemical reaction, the Group VIII metals of the Mendelyeev's Periodic Table are preferred, i.e., platinum, ruthenium, palladium, osmium, iridium, rhodium, and alloys thereof. The catalytic metal is preferably employed in a very finely divided state in order to provide as large a reactive electrode surface as possible. Thus, metals such as palladium and platinum are preferably employed as the so-called metal blacks.

The polymer which is dispersed with the catalytic metal and which is applied to the metal support must be relatively hydrophobic. Thus, exemplary polymers include polystyrene, polyethylene, polytrifluoroethylene, polyvinylfluoride, polyvinylidenefluoride, polytrifluorochloroethylene, and co-polymers thereof. Because of their exceptional hydrophobicity, as well as their resistance to heat and corrosive electrolyte, polytetrafluoroethylene and polyfluoroethylene-propylene co-polymers are preferred.

The admixture of catalytic metal and polymer can be formed employing numerous methods with it only being essential that the polymer be uniformly distributed throughout the catalytic layer. Thus, the admixture may be applied to the metal support from a dispersion of the metal black and the hydrophobic polymer prepared by suspending the materials in a suitable medium such as water. After the catalytic metal and polymer particles are mixed in the water to obtain a uniform dispersion, the water is removed sufficiently to give a doughlike mass which can be applied to the metal support by brushing, pressing, or rolling. Alternatively, the catalytic metal-polymer layer can be applied to the support by spraying from an aqueous dispersion. As noted hereinbefore, the presence of the polymer in the voids or cavities of the metal support prevents blowing through of the catalytic dispersion during the spraying operation. Furthermore, the ratio of polymer to catalytic metal in the dispersion is not critical. Normally, the desideratum is to have as light a load of the precious metal as possible, but with a high surface area exposed for electrochemical reaction. In this manner, the cost of the electrode is kept low. In the usual construction, the catalytic metal-polymer admixture will contain from about 90 to 55 percent metal and from 10 to 45 percent polymer on a weight basis. The optimum percentages is from about 65-80 percent metal and from 35-20 percent polymer on a weight basis.

Although the heating of the electrode structure at elevated temperatures to sinter at least the polymer particles to obtain bonding is essential to the obtaining of an electrode with high mechanical stability, the temperature of the sintering and the time of the operation can vary over a substantial range. Thus, normally, the temperature of the sintering operation will be from about 180 to 325° C. for periods varying from 5 to 45 minutes. Inasmuch as there is a relationship between time and temperature, within limits, if the temperature is increased, the time of the sintering operation can be reduced. It has been found, however, that greater reproducibility is obtained if the temperature is maintained between 220 to 300° C. for periods of about 10 to 35 minutes. Furthermore, as noted hereinbefore, it has been found that prior to the sintering operation, it is desirable, although not absolutely necessary, to dry the electrode in air at slightly elevated temperatures, i.e., 50 to 95° C., and lightly press the structure.

Additionally, it has been found that the sintering of the electrode can be carried out in a conventional draft furnace or the electrode can be placed in a light metal foil envelope, which is heated between two heating elements. For example, the catalyst loaded metal support can be placed in an aluminum foil envelope and the envelope directly heated between two hot-plates to obtain the necessary sintering. Preferably, however, the sintering operation is carried out in a draft furnace.

Having described the invention in general terms, the following examples are set forth to more particularly illustrate the invention. Parts are by weight unless otherwise specified.

Example 1

A 100 mesh nickel screen with a wire diameter of 0.002 inch and a weight of 14.4 mg./cm.$^2$ was sealed by dipping in a 2:1 aqueous suspension of polytetrafluoroethylene (PTFE) containing 40 weight percent PTFE. The screen was allowed to drain in a vertical position, and thereafter dried by bringing it in contact with a flow of warm air. A film containing approximately 3 mg./cm.$^2$ of PTFE remained in the area between the wires of the screen where it had been held by surface tension. However, the major part of the wire surface remained bare, permitting good electrical contact to the catalytic particles. Although the PTFE layer gives the appearance of being relatively non-porous, the layer does contain sufficient porosity for permeation of the membrane by gases. The sealed screen is sprayed on one side with an aqueous dispersion of PTFE and platinum black sufficient to give 10 mg./cm.$^2$ of platinum and 4 mg./cm.$^2$ of PTFE with a small spray gun. The resultant electrode was placed in an oven and dried in air at 85° C. for 30 minutes. After drying, the electrode was placed between two sheets of aluminum foil and the two opposing edges folded over to make an envelope. The remaining two sides are left open to permit the exit of any gases released during the sintering process. It is essential to handle the electrodes carefully at this stage of the process since the platinum-PTFE layer adheres poorly until the electrode is sintered. The structure is sintered in its foil envelope between two heating elements. The heating is carried out by maintaining the elements at a temperature of 250° C. for 30 minutes. Alternatively, it may be desirable to accomplish the sintering by heating in a cycle with the temperature of the foil envelope being slowly raised to a maximum temperature of about 275 and thereafter slowly cooled to approximately room temperature. The electrode which is ready for operation in a fuel cell is removed from the metal foil envelope.

The electrode so formed was tested in a fuel cell as the anode and fed with pure hydrogen at 25° C. The electrolyte was a 30 percent aqueous solution of potassium hydroxide. The cell provided current densities as follows:

| Cell voltage (mv.): | Current density (ma./cm.$^2$) |
|---|---|
| 610 | 800 |
| 700 | 515 |
| 800 | 245 |
| 900 | 70 |

In an endurance test, the electrode was run for 500 hours at 70° C. in a 30 percent aqueous solution of potassium hydroxide without losing its mechanical integrity.

Example 2

A 50 mesh tantalum screen having a wire diameter of 0.003 inch and a weight of 28.5 mg./cm.$^2$ was sealed by spraying with an aqueous dispersion of PTFE at 24 percent solids with the dispersion containing a minor amount of surfactant. After spraying, the sealed screen was dried by contacting it with a flow of warm air. A layer of PTFE approximately 3½ mg./cm.$^2$ remained, filling the area between the wires of the screen, where it had been held by surface tension. Substantially all of the wire surface remained bare thereby having exposed area for contact with the catalytic particles of the electrode. The dried screen was then brushed with a dispersion of PTFE and platinum black sufficient to provide 5 mg./cm.$^2$ of platinum and 2 mg./cm.$^2$ of PTFE per side. The electrode was placed in an oven and dried in air at 85° C. for 30 minutes, and thereafter lightly rolled. After rolling, the electrode was placed in a draft furnace and sintered in air at 250° C. for 40 minutes.

The electrode so formed was tested in a fuel cell as the anode and fed with pure hydrogen at 25° C. The electrolyte was 5 N sulfuric acid. The cell provided current densities as follows:

| Cell voltage (mv.): | Current density (ma./cm.$^2$) |
|---|---|
| 800 | 665 |
| 700 | 690 |
| 600 | 730 |
| 500 | 740 |
| 300 | 800 |

In an endurance run, the electrode was operated for 700 hours at 150° C. in 85 percent phosphoric acid without losing its mechanical integrity.

Example 3

Thirteen electrodes were fabricated substantially as shown in Example 1 except sintering was performed in an oven and tested in a fuel cell employing 30 percent aqueous potassium hydroxide at 25° C. in order to demonstrate the reproducibility of the electrodes. The data obtained is shown in Table I.

TABLE I

| Electrode No. | Pt. loading, mg./cm$^2$ | Size, inch x inch | H$_2$ 150 | H$_2$ 300 | O$_2$ 150 | O$_2$ 300 | Air 150 | Air 300 |
|---|---|---|---|---|---|---|---|---|
| 3.1 | 8.5 | 8 x 8 | 39 | 73 | 895 | 861 | 862 | 830 |
| 3.2 | 8.5 | 2 x 2 | 48 | 93 | 892 | 863 | | |
| 3.3 | 9.6 | 2 x 2 | 50 | 93 | 885 | 854 | | |
| 3.4 | 8.9 | 8 x 8 | 50 | 90 | 888 | 857 | 858 | 7983 |
| 3.5 | 8.8 | 8 x 8 | 49 | 89 | 887 | 858 | 860 | 800 |
| 3.6 | 8.3 | 8 x 8 | 51 | 93 | 884 | 848 | 860 | 799 |
| 3.7 | 8.6 | 8 x 8 | 46 | 84 | 893 | 863 | 873 | 825 |
| 3.8 | 9.2 | 4 x 4 | 50 | 94 | 892 | 866 | 865 | 830 |
| 3.9 | 8.8 | 8 x 8 | 52 | 91 | 895 | 863 | 865 | 829 |
| 3.10 | 9.0 | 8 x 8 | 50 | 90 | 899 | 870 | 860 | 825 |
| 3.11 | 9.6 | 8 x 8 | 50 | 86 | 888 | 855 | 850 | 804 |
| 3.12 | 8.8 | 6 x 6 | 49 | 94 | 886 | 855 | 860 | 807 |
| 3.13 | 10.0 | 7 x 9 | 55 | 101 | 886 | 855 | 855 | 799 |
| Average | | | 49 | 90 | 890 | 859 | 861 | 814 |
| Max. deviation | | | 16 | 28 | 15 | 22 | 23 | 48 |
| Std. deviation | | | 3.6 | 6.4 | 4.5 | 5.7 | 5.4 | 15.8 |

As is apparent from the above table, excellent reproducibility in the electrodes was obtained from the present method of construction.

In Examples 1–3, the metal support screen can be replaced with other metal supports including copper, silver, gold, iron, and palladium. Additionally, the metal of the catalytic layer can be replaced by other electrochemically active materials including nickel, copper, gold, silver, palladium, ruthenium, and rhodium. The hydrophobic polymer used to seal the support screen and in the catalytic layer can be replaced with other polymers including polystyrene, polyethylene, polytrifluoroethylene, polyvinylfluoride, polyvinylidenefluoride, polytrifluorochloroethylene, and co-polymers thereof.

The electrodes of the present invention can be employed in fuel cells using virtually any of the prior art electrolytes. As is well known, for an efficient fuel cell, it is necessary that the electrolyte remain substantially invariant and have high ionic conductivity. The alkaline electrolytes such as sodium hydroxide, potassium hydroxide, and the alkanolamines are particularly desirable. However, acid electrolytes such as sulfuric acid, phosphoric acid, etc., may be employed.

Additionally, the present electrodes can be employed as either the anode or cathode of the fuel cell. By judiciously selecting the activating metal of the catalytic layer, the electrodes of the present invention can be tailored to be particularly suitable for any specific fuel including hydrogen, carbon monoxide, methane, methanol, propane, and kerosene vapors. Additionally, metals such as silver and gold provide excellent properties in the electrode for use as the cathode, operated on air as the oxidant.

Moreover, the present electrodes can be utilized in fuel cell systems operating in a wide temperature range. One of the outstanding features of the present electrodes, however, is their ability to provide reasonable current densities at a select voltage at low temperatures. Preferably, therefore, the present electrodes will be employed in fuel cells operated at temperatures of from about 25 to 150° C. The cells can be operated, however, at temperatures as high as about 250° C., it being understood that generally the higher the temperature, the greater the electrochemical reaction. It is further understood, however, that at higher temperatures ancillary problems such as insulation of the cell and the like are increased.

As will be apparent to one skilled in the art, the illustrative examples are only set forth as preferred embodiments of the invention. However, the invention is not to be construed as limited thereby. It is possible to produce still other embodiments without departing from the inventive concept herein described and such embodiments are within the ability of one skilled in the art. Furthermore, as will be apparent to those skilled in the art, while the invention has been described with reference to fuel cells, it is possible to employ the aforesaid electrodes in other electrochemical devices.

It is claimed:

1. The method of constructing a lightweight electrode comprising the steps of filling the internal voids of a porous metal support with a thin film of a hydrophobic polymer in such manner that substantially the entire surface of said support is free of said polymer and drying said film; applying a uniform coating of a catalytic material onto the exposed metal surface of said filled support, said catalytic material comprising an electrochemically activating metal and a hydrophobic polymer, and thereafter heating the support at a temperature elevated sufficiently to sinter and bond the hydrophobic polymer.

2. The method of claim 1 wherein the filling of the internal voids of the metal support is accomplished by dipping the metal support in a solution of the hydrophobic polymer.

3. The method of claim 1 wherein the filling of the internal voids of the metal support is accomplished by spraying the metal support with an aqueous dispersion of the hydrophobic polymer.

4. The method of claim 1 wherein the filling of the internal pores of the metal support is accomplished by brushing the metal support with an aqueous dispersion of the hydrophobic polymer.

5. The method of claim 1 wherein the uniform coating of catalytic material is applied to the filled support by brushing the catalytic metal onto the support.

6. The method of claim 1 wherein the hydrophobic polymer is polytetrafluoroethylene.

7. The method of claim 1 wherein the catalytic material is an admixture of polytetrafluoroethylene and platinum black.

8. The method of claim 1 wherein the sintering is carried out at a temperature of 180 to 325° C. for a period of 5 to 45 minutes.

9. The method of claim 1 wherein the metal support is tantalum.

10. The method of claim 1 wherein the metal support is nickel.

11. The method of claim 1 wherein the metal support is titanium.

12. The method of claim 1 wherein the heating of the structure is accomplished in an oven in the presence of air.

13. The method of claim 1 wherein the metal support is placed in a metal foil envelope prior to heating at an elevated temperature.

14. A fuel cell electrode comprising a porous metal support having substantially only the internal voids of said metal support filled with a hydrophobic polymer and an entire surface thereof being substantially free of said polymer, the filled exposed metal surface of said filled support being uniformly coated with a catalytic dispersion of activating metal and a hydrophobic polymer.

15. The electrode of claim 14 wherein the hydrophobic polymer is polytetrafluoroethylene.

16. The electrode of claim 15 wherein the porous metal support is nickel.

17. The electrode of claim 15 wherein the porous metal support is tantalum.

18. The electrode of claim 15 wherein the porous metal support is titanium.

19. The electrode of claim 14 wherein the precious metal is platinum.

20. An electrochemical device comprising a fuel electrode, an oxidizing electrode, and an electrolyte in contact with each of said electrodes, at least the oxidizing electrode being non-consumable and comprises a porous metal support having substantially only the internal voids of said metal support filled with a hydrophobic polymer and an entire surface thereof being substantially free of said polymer, said filled exposed metal surface of said filled support being uniformly coated with a catalytic dispersion of activating metal and a hydrophobic polymer.

21. The fuel cell of claim 20 wherein the hydrophobic polymer is polytetrafluoroethylene.

22. The electrochemical device of claim 20 wherein the surface of the electrode comprising the catalytic dispersion is in contact with the electrolyte of the cell.

References Cited

UNITED STATES PATENTS

| | | | |
|---|---|---|---|
| 3,077,507 | 2/1963 | Kordesch et al. | 136—120 |
| 3,097,974 | 7/1963 | McEvoy et al. | 136—120 |
| 3,183,123 | 5/1965 | Haworth | 136—120 |
| 3,203,829 | 8/1965 | Seyer et al. | 117—132 |
| 3,215,562 | 11/1965 | Hindin | 136—120 |

FOREIGN PATENTS 938,708  10/1963  Great Britain.

WINSTON A. DOUGLAS, *Primary Examiner.*

A. SKAPARS, *Assistant Examiner.*

U.S. Cl. X.R.

117—128.4; 136—86